United States Patent [19]
Lacey

[11] Patent Number: 5,932,150
[45] Date of Patent: Aug. 3, 1999

[54] REPLICATION OF DIFFRACTION IMAGES IN ORIENTED FILMS

[75] Inventor: Deryl C. Lacey, Canton, Mich.

[73] Assignee: Holo-Source Corporation, Livonia, Mich.

[21] Appl. No.: 08/918,761

[22] Filed: Aug. 25, 1997

[51] Int. Cl.⁶ .................................................. B29D 11/00
[52] U.S. Cl. ........................... 264/1.34; 264/1.6; 264/1.7; 264/210.7; 264/284; 264/290.2; 425/327; 425/363; 425/385
[58] Field of Search ................................... 264/1.7, 1.31, 264/1.34, 1.6, 210.7, 280, 284, 290.2; 425/327, 363, 384, 445, 446, 385

[56] References Cited

U.S. PATENT DOCUMENTS

| | | | |
|---|---|---|---|
| 4,162,343 | 7/1979 | Wilcox et al. ............................. | 428/212 |
| 4,250,209 | 2/1981 | De Leeuw et al. ....................... | 427/250 |
| 4,547,141 | 10/1985 | Ruschmann ............................... | 425/374 |
| 4,758,396 | 7/1988 | Crass et al. ............................... | 264/145 |
| 4,790,893 | 12/1988 | Watkins ...................................... | 156/232 |
| 4,874,657 | 10/1989 | Lo et al. ..................................... | 264/280 |
| 4,913,858 | 4/1990 | Miekka et al. . | |
| 4,921,319 | 5/1990 | Mallik . | |
| 4,923,572 | 5/1990 | Watkins et al. . | |
| 4,956,140 | 9/1990 | Rolles et al. ............................... | 264/280 |
| 4,968,370 | 11/1990 | Watkins ...................................... | 156/232 |
| 5,137,661 | 8/1992 | Kanome et al. . | |
| 5,139,727 | 8/1992 | Utsumi et al. ............................. | 264/210.7 |
| 5,155,608 | 10/1992 | Miekka et al. ............................. | 359/2 |
| 5,164,227 | 11/1992 | Miekka et al. ............................. | 427/162 |
| 5,227,897 | 7/1993 | Fohrman et al. .......................... | 359/3 |
| 5,248,470 | 9/1993 | Dollinger et al. ........................ | 264/171 |
| 5,464,690 | 11/1995 | Boswell ..................................... | 428/334 |

FOREIGN PATENT DOCUMENTS

| | | | |
|---|---|---|---|
| WO93/13929 | 7/1993 | WIPO .......................................... | 264/1.6 |

Primary Examiner—Mathieu D. Vargot
Attorney, Agent, or Firm—Gifford, Krass, Groh, Sprinkle, Anderson & Citkowski, P.C.

[57] ABSTRACT

The present invention provides a method and apparatus for impressing a diffraction image into an oriented polymeric film wherein, after orientation of the film, the temperature of the film is raised to a desired annealing temperature, the film temperature being continuously maintained above room temperature while a diffraction pattern is embossed directly into the surface of the film.

18 Claims, 3 Drawing Sheets

REPLICATION OF DIFFRACTION IMAGES IN ORIENTED FILMS

FIELD OF THE INVENTION

This invention relates to a method and apparatus for embossing a surface relief diffraction image on a polymeric film, and more particularly to such a method whereby the image is applied to oriented film.

BACKGROUND OF THE INVENTION

While polymeric films are used in countless applications, the demand is increasing for films incorporating decorative diffraction patterns and holographic images. Such decorative films are commonly used for laminated paperboard and heat sealable flexible packaging. While a variety of films are available for use in such applications, oriented films are frequently preferred due to their improved strength, tear, and barrier properties as well as their enhanced durability and dimensional stability. In particular, such oriented films may be utilized as an embossed, metallized product or as a transfer film which is repeatedly reused to produce a multitude of other embossed, metallized products.

Oriented film is produced by stretching the film along one direction, either the transverse or longitudinal direction, producing uniaxially oriented film, or stretching the film along both directions, producing biaxially oriented films. Biaxially oriented films may be produced by simultaneously stretching the film in both directions or sequentially stretching the film along the transverse and longitudinal directions. Simultaneous biaxially oriented films may be produced using a tentering process or a bubble process whereby a bubble is blown of the film, stretching it biaxially. Sequentially biaxially oriented films are produced by stretching the film in sequential steps, including stretching the film in both directions in each step of a series of sequential steps, stretching the film completely in one direction then completely in the other direction, or stretching the film in a repetitive process by stretching the film first in one direction, then in the second direction, and stretching the film again in the first direction. Sequentially biaxially oriented films are typically produced using a tentering process, whereby a tentering frame comprising moving endless chains grasp the edges of the film, stretching the film along a direction transverse to the direction of film travel. The extent of stretching along the transverse and longitudinal directions in a biaxially oriented film need not be equal.

Uniaxial orientation enhances the physical properties of films in one direction; certain properties in the perpendicular direction are usually unimproved. The orientation temperature, governed by the material determines the final properties. Semi-crystalline polymers are oriented between the glass transition temperature $T_G$ and the melting $T_M$, whereas amorphous polymers are oriented above $T_G$. In general, the polymer is oriented by rapid stretching in the temperature ranges as described above, followed by rapid annealing. The latter ensures that the orientation is not lost by molecular relaxation. The degree of orientation is determined by the extension rate and the degree of extension.

Prior art methods of producing surface relief diffraction images on embossed biaxial oriented films utilize a thermoplastic film that has been oriented using either simultaneous biaxial orientation, as with the bubble process, or by sequential biaxial orientation commonly accomplished with drawing and tentering. After the extrusion and orientation of the film, the oriented film is cooled and wound into a roll for transport to a separate area or facility where embossing of the film takes place.

During the embossing step, the film is moved over a heated die roller that presents the moving web of film with the surface relief structure to be replicated. By opposing the die roller with a platen roller, and passing the film between the die roller and platen, sufficient heat and nip pressure can be applied to transfer a diffraction pattern into the film web.

These prior art methods suffered from problems such as distortion of the film web, degradation of the oriented crystalline structure of the film, and inconsistent embossing brightness due in part to the inability to apply uniform heat and nip pressure to the film across film widths wider than 12 inches. While the use of narrow embossing rollers (typically less than 12 inches in length) and narrow web films overcomes some of these problems by permitting the controlled application of uniform heat and pressure, the short embossing rollers resulted in slow speeds, narrow web widths, and low manufacturing yields.

To properly emboss a wider web of film and avoid the prior art problems associated with the application of uniform heat and pressure, the film side to be embossed is first coated with an emboss coating. The emboss coating has a melting point which is lower than the melting point of the film being embossed. Thus, less heat is required to soften the emboss coating for proper embossing. Alternately, a liquid resin may be precoated onto the film web and cured with ultraviolet or electron beam radiation while simultaneously embossing the film.

To achieve a proper diffraction pattern in the subsequent embossing step, the coated film is preheated prior to contacting the embossing die roller, thereby softening the coating while maintaining the properties of the base film. In this manner, dependence on uniform heat and pressure is reduced and wide rollers achieve the necessary level of uniformity of pressure across the wide film web.

If the coated, embossed film is utilized in the manufacture of a metal coated film product, a metallic layer such as aluminum or the like is applied to the emboss coating by vapor deposition or similar application method after the embossing step.

In the prior art, if the film is to be utilized as a transfer film which can repeatedly be reused to produce a multiplicity of metallic, embossed films, a release coating is applied to the transfer film prior to the application of the emboss coating. The release coating forms a weak bond with the surface of the transfer film and forms a strong bond with the emboss coating. A metallic layer such as aluminum or the like is applied over the emboss coating after embossing. A second substrate is then laminated to the previously embossed metallic layer using catalytic or actinic radiation curable adhesive or the like. When this structure of transfer film, release coating, emboss coating, metallic layer, adhesive and second substrate is delaminated, a failure occurs in the weaker bond between the transfer film and the release coating, the emboss coating and metallic layer remaining with the second substrate and adding a high quality, diffractive metallic surface to such substrate. When this structure is delaminated, the embossed coating is split from the transfer film, leaving an unembossed transfer film. Thus, each use of the transfer film requires the additional step of embossing the diffraction imagery into a newly applied coating. Depending on the composition of the film, the oriented transfer film can be reused by reapplying the release coating and emboss coating, embossing the emboss coating, redepositing a new layer of metal onto the resins, and applying an adhesive layer and second substrate. The additional costs incurred by the reapplication of such coatings renders the use of oriented transfer films for many products prohibitively expensive.

An improvement by Watkins et al., described in U.S. Pat. No. 4,968,370 allows the formation of diffraction information in a carrier film by using extrusion casting of thick profile films. Substantially molten thermoplastic resin such as polypropylene is continuously extruded onto a rotating cooling cylinder presenting a surface relief diffraction pattern or holographic image to the extruded film. The film may be repeatedly utilized as a transfer film without repeated embossing of the transfer film. Yet the transfer film disclosed by Watkins et al. lacks the desirable strength properties of oriented film.

Thus, it will be appreciated that there is a need for a process wherein a diffraction pattern may be embossed directly into an oriented polymeric film, preferably a wide film having a width of between 12 and 120 inches. Oriented films thus embossed may be employed as diffraction imaging materials themselves, and they can also function as transfer films or masters for the manufacture of diffraction imaging materials. As will be described in detail hereinbelow, the present invention provides for the embossing of complex diffraction patterns into durable, relatively hard, dimensionally stable, oriented polymeric films.

SUMMARY OF THE INVENTION

The present invention overcomes disadvantages of the prior art by providing a process for impressing a diffraction image into a polymeric film comprising the steps of providing a body of polymeric film and orienting the film. The film is oriented by overtensioning the film, thereby causing the axes of the film molecules to assume a particular direction. The film is preferably oriented along a first, longitudinal axis and a second, transverse axis, the second axis being disposed normally to the first axis. The temperature of the film is then raised to a desired annealing temperature above room temperature. Room temperature is defined as being approximately 20° C. Once the temperature of the film has been raised to a temperature above room temperature, the temperature of the film is maintained above room temperature while a diffraction pattern is embossed into a surface of the film. The temperature of the film is continuously maintained above room temperature from the time the film temperature is first raised to the desired annealing temperature until the time the diffraction pattern is embossed into the film. The film is then cooled to room temperature.

In the preferred process, a body of extruded polymeric film is provided and, preferably, a thermoplastic film such as polypropylene is utilized.

The process of the present invention may further include the step of depositing a metallic layer over the embossed surface of the film. An additional step of the invention includes demetallizing selected areas of the metallized embossed surface of the film. The metallic layer deposited over the embossed surface of the film may be released, in a subsequent step, from the embossed surface of the film.

The apparatus of the present invention impresses a diffraction image on a polymeric film. The apparatus comprises means for orienting the film, preferably along both the first and second axes. Means are further provided for raising the temperature of the film to a temperature above room temperature, and, preferably, such means include an annealing oven. Means for maintaining the temperature of the film above room temperature are provided. Means for embossing a diffraction pattern into a surface of the film are provided while the film is maintained above room temperature and, in the preferred embodiment, such means includes a rotating die roller positioned proximate to the means for raising the temperature of the film. The temperature of the film is continuously maintained above room temperature from the time the film temperature is raised to the desired annealing temperature until the time the diffraction pattern is embossed into the film. In the preferred embodiment, means such as a cooling tunnel for cooling the film to room temperature after embossing are provided.

In the preferred embodiment of the apparatus, means for orienting the film comprises a plurality of calender rollers and a tenter frame. Preferably, the film is oriented along the first, longitudinal axis by overtensioning the film by drawing the film through a series of powered calender rollers. The film is, in the preferred embodiment, oriented along the second, transverse axis by clamping the edges of the film in a tenter frame and overtensioning the film. Tension along the second axis is relaxed by converging the edges of the film in the tenter frame.

By placing the rotating cylindrical embossing die or other means for embossing the film after the drawing and tentering phase but prior to the cooling tunnel, the film remains above its glass transition temperature and the surface groove structure embossed into the film remains intact until cooling. Thus, a finished, oriented film containing diffraction images may be produced in a single, more economical operation.

Other objects, advantages and applications of the present invention will be made clear by the following detailed description of a preferred embodiment of the invention. The description makes reference to drawings in which:

DETAILED DESCRIPTION OF THE INVENTION

The present invention is a process and apparatus for impressing a diffraction image on polymeric film wherein the temperature of the film is raised to a desired annealing temperature above room temperature and the temperature of the film is maintained at above room temperature while a diffraction pattern is embossed into a surface of the film. The temperature of the film is continuously maintained above room temperature from the time the film temperature is raised to the desired annealing temperature until the time the diffraction pattern is embossed into the film.

Figure 1:
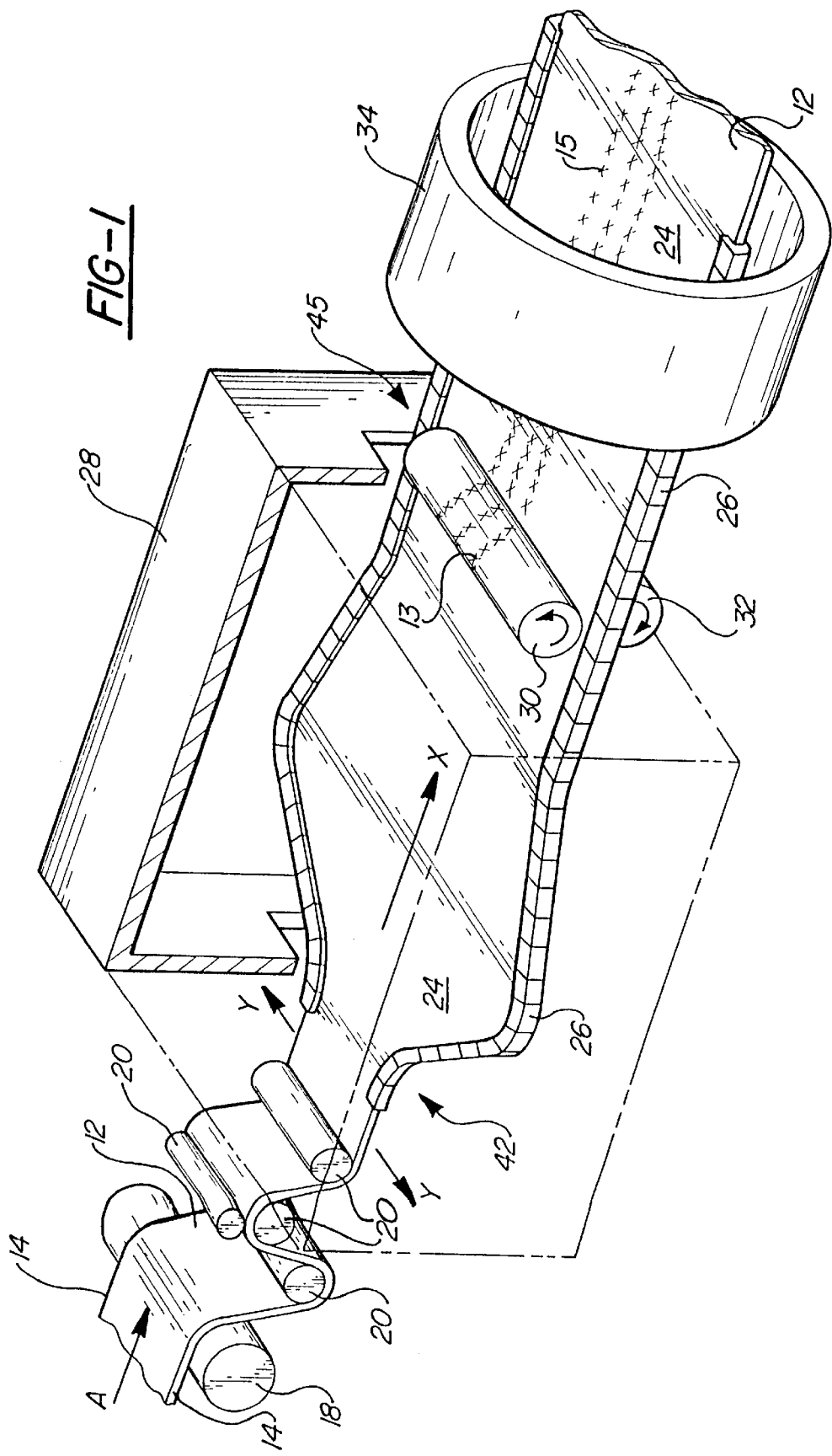
FIG. 1 is a perspective view of the apparatus of the present invention.

The process of the present invention comprises the step of providing a body of polymeric film, depicted in FIG. 1 at 12, the polymeric film extending along a first, longitudinal axis designated as "X" and a second, transverse axis designated as "Y". In the preferred embodiment, a resin such as polypropylene is extruded at approximately 270° C. onto a casting roller 18 which yields a film having an initial thickness of approximately 0.025 inches. This extruded film web is preferably cooled to a temperature between 100–110°

C. prior to orientation of the film. Preferably, the film web is moving at a rate of 100–300 feet per minute. In the preferred embodiment, a single layer isotactic polypropylene film is provided, although other suitable films may be utilized, including coextruded films, polyester films and the like.

The film is then oriented along the first and/or second axis of the film utilizing any of the orientation processes available in the art. In the preferred process, the film is overtensioned along both the first and second axes, creating a biaxially oriented film. By overtensioning the film along a given axis, the axes of the film molecules assume the same direction. Orientation of the film enhances many properties of the film, including strength, durability, tear resistance and barrier properties. The body of film is preferably oriented along the first, X axis by passing the film through a series of powered calender rollers rotating at different speeds. As the film is drawn through the calender rollers, a tensile force is applied to the film along the first, X axis, aligning the molecules of the film. In the preferred embodiment, the film is oriented in the longitudinal direction prior to orientation in the transverse direction.

Next, the film is tensioned along the second, transverse axis, preferably by gripping the edges of the film in a tenter frame and applying a tensile force to orient the film along the second, Y axis. In the preferred embodiment, the film is preheated prior to orientation of the film in the transverse direction. A single layer, isotactic polypropylene film is preferably preheated to about 120° C.

Next, the temperature of the film is raised to a desired annealing temperature. For polypropylene films, a preferred annealing temperature is approximately 175° C. The appropriate annealing temperature will vary with the characteristics of the film utilized. Preferably, the film is passed through an annealing oven while tension is maintained along the first, longitudinal axis and along the second, transverse axis.

The temperature of the film is continuously maintained at a temperature above room temperature as the film exits the annealing oven. Room temperature is defined as being approximately 20° C.

While the film is elevated above room temperature, a diffraction pattern is embossed into the surface of the film. Due to the elevated temperature of the film, the diffraction pattern may be uniformly embossed into the surface without high levels of nip force which may cause distortion of the image. Any conventional embossing technique, such as the application of a patterned roller to the surface may be used. While a variety of methods may be used to emboss the diffraction pattern into the surface of the film, in the preferred embodiment of the present invention, a diffracting groove structure is created on an embossing die which is preferably a rotating roller. Such dies are frequently replicated from master dies using a standard nickel sulfamate electroforming process.

Process conditions including nip pressure and temperature, annealing oven temperature, extent of orientation along each axis and web speed will vary with the specific film polymer selected and the properties of that polymer, such as the glass transition temperature, melt temperature, melt flow index and degree of crystallinity.

While the preferred embodiments of the invention have been shown using diffraction patterns embossed into biaxially oriented polypropylene, it should be recognized that the type of diffraction image, the substrate polymer chosen and the specific preferences of the manufacturer could vary yet still be within the scope of the principles disclosed.

A known, separate operation after embossing and cooling of the film web consists of vacuum metallizing the film web with a 100–500 angstrom coating of a metal such as aluminum or the like which enhances the reflective properties of the diffraction pattern or hologram. A known decorative or functional variation of this last step is to print specific designs on the embossed film with a soluble resin prior to metallizing. After metallizing, the printed area is rendered transparent by washing with an appropriate solvent which rapidly penetrates and dissolves the thin overlaying metallic layer.

The method of the present invention may also include applying a second film substrate to the metallized layer, the metallized layer and second film substrate forming a stronger, nonreleasable bond therebetween. Preferably, an adhesive such as a catalytic or actinic radiation curable adhesive is utilized. Next, the structure is delaminated so that the weaker bond formed between the embossed transfer film surface and the metallic layer is broken. Thus the oriented, embossed transfer film may be reused to form other products such as the product just formed without reembossing or recoating the transfer film.

The apparatus of the present invention is depicted in FIG. 1. An elongated body of film 12 is provided, the film 12 extending along a first, X axis which is parallel to the longitudinal direction of film movement, and a second, Y axis which is transverse to the direction of film movement, the X axis being disposed normally to the Y axis. In the preferred embodiment, the web of film 12 is extruded from an extruder 16, shown in FIG. 2, onto a casting roller 18 by a wide variety of well-known prior art extrusion processes. In the preferred embodiment, a single layer of polypropylene film web is extruded onto roller 18 and cooled to in the range of 100–110° C.

The film is then oriented along the first, longitudinal axis X and/or along the second, transverse axis Y. In the preferred embodiment, the film is oriented along both axes. As shown in FIG. 1, film 12 is first oriented along the first, longitudinal axis by drawing the film 12 through a series of powered calender rollers 20. Such rollers are commonly used for overtensioning a web of film in the longitudinal direction. As the film is drawn through rollers 20, a longitudinal tensile force is applied to the film, orienting the film molecules in the longitudinal direction.

Figure 2:
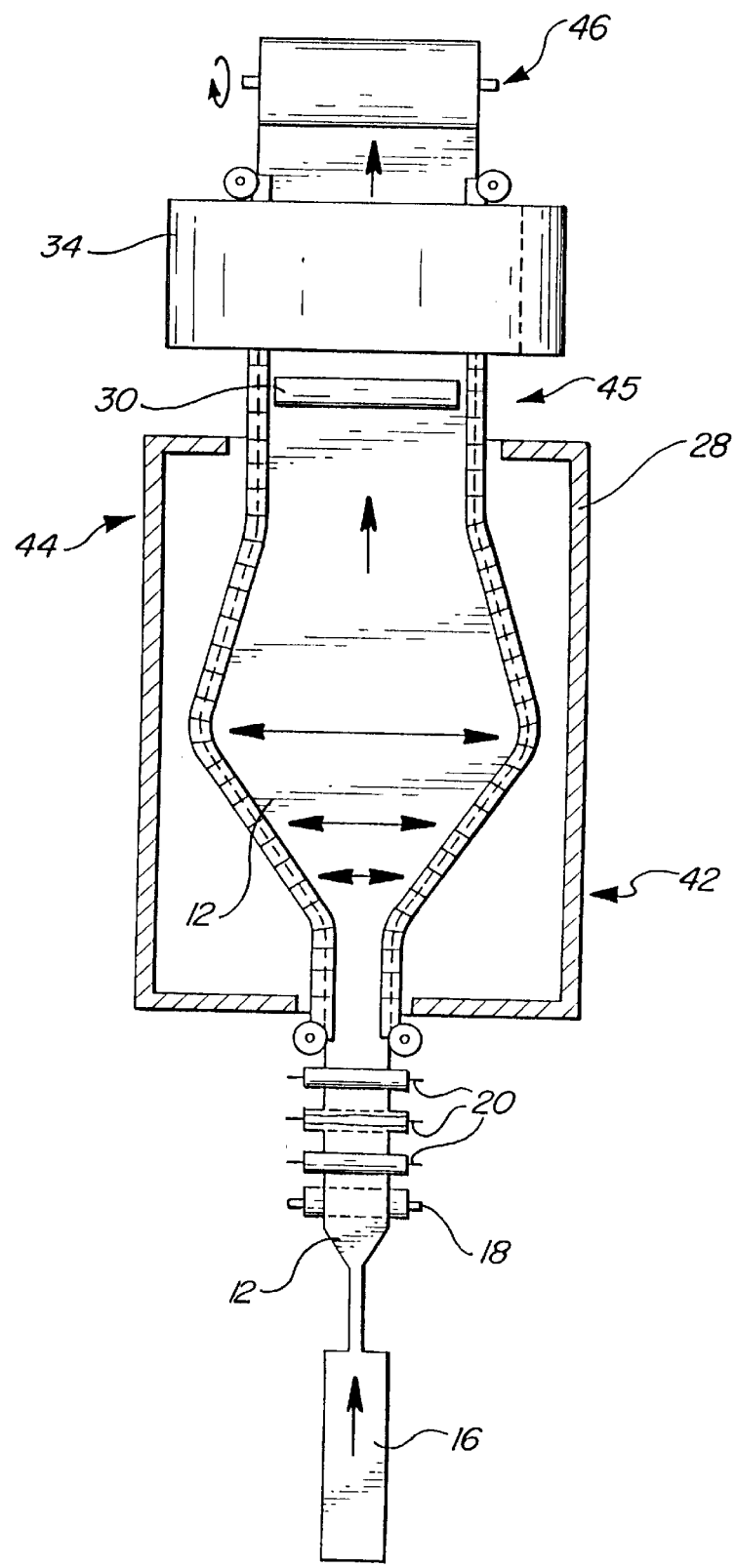
FIG. 2 is an overhead view of the apparatus of the present invention.

In the embodiment depicted in FIG. 2, the film is preheated in a preheating zone 42 prior to orientation of the film in the transverse direction. In the preferred embodiment, the polypropylene web is heated to above 120° C. prior to orientation along the second, transverse axis Y.

Tensile force is applied to the film along the second, transverse axis Y to orient the film 12 in the transverse direction. Preferably, a tenter frame 26 is utilized which includes an endless chain of grippers configured to grip the edges 14 of the film. Such tenter frames are commonly utilized in the art to orient films in the transverse direction. Tenter frame 26 grips the edges 14 of the longitudinal film, applying a tensile force to the film and overstretching the film, increasing the width of the film and orientating the film in the transverse direction.

Just prior to the film entering the annealing stage 44, the tenter frame 26 converges slightly as the film web 12 enters the annealing stage. This convergence reduces the tension applied to the web 12 but maintains a constant tension in the web 12.

The temperature of the film 12 is increased by passing the film 12 through an annealing oven 28. In the preferred embodiment, polypropylene film is elevated to a temperature around 175° C. during the annealing stage. As discussed supra, the desired annealing temperature will vary depending on the substrate utilized for film 12.

The temperature of the film web 12 is continuously maintained at a temperature above room temperature as the film web 12 progresses from the annealing zone 44 to the embossing station, indicated at 45 in FIGS. 1 and 2, wherein rotating die roller 30 and opposing roller 32 emboss a diffraction pattern into the surface 24 of the film 12. In the preferred embodiment, the rotating die roller 30 and opposing roller 32 are positioned in the vicinity of the annealing oven so that the diffraction pattern 13 is embossed into the surface 24 of the film 12, while the film 12 is well above room temperature.

A cooling chamber 34 is provided to cool the film to room temperature. The temperature of the film may be lowered to room temperature by a variety of mechanisms other than cooling chamber 34 and remain within the scope of the present invention.

After the film web 12 exits the cooling chamber 34, the tenter frame 26 releases the transverse tension in the film. Lastly, the embossed film is wound in winding station 46. In the preferred embodiment, a roller takeup is utilized for winding the web of film 12 onto cores for storage.

Figure 3:
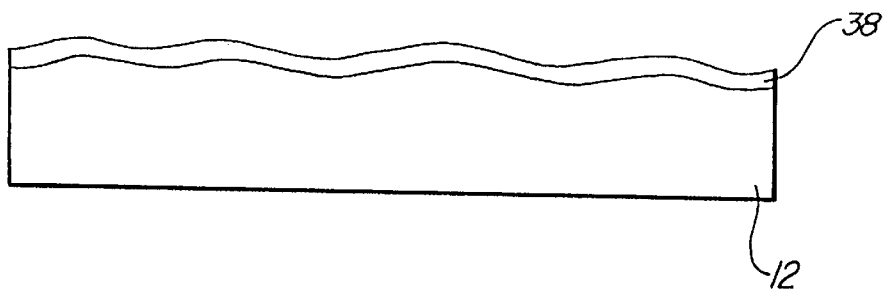
FIG. 3 is a cross-sectional view of the a preferred embodiment of the metallized film product of the present invention.

Subsequent operations may be performed on the film web 12, such as application of a metallic layer 38 to the embossed film web 12. Such a product is depicted in FIG. 3. A metallic layer having a width of 100–500 angstroms is preferably deposited onto the embossed surface of the film after the film is cooled to room temperature. In alternate embodiments, selected areas of the metallized embossed surface may be demetallized to provide a varied, decorative pattern. Such metallized film products are suitable for a wide variety of uses, including packaging and decorative uses.

Figure 4:
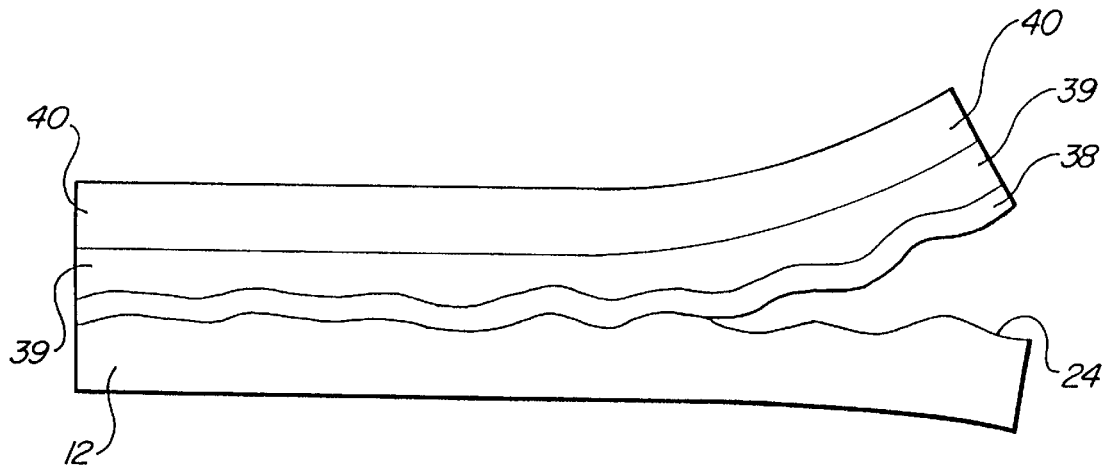
FIG. 4 is a cross-sectional view of the film of the present invention being utilized as a transfer film, illustrating the separation of an embossed, metallized film being separated from the transfer film.

The present invention may be utilized to manufacture a transfer film, depicted in FIG. 4, wherein a diffraction pattern is embossed into the upper surface 24 of the film 12. A metallic layer 38 of a metal such as aluminum or the like is applied by a variety of known prior art methods such as vapor deposition or the like. Metallic layer 38 forms a releasable bond on the diffraction pattern 24 on the upper surface of film 12.

A second substrate 40, preferably composed of a paper or polymer, is bonded to metallic layer 38 by an adhesive layer 39. When the composite structure is delaminated, the weaker bond between film 12 and metallic layer 38 fails first transferring a perfect replica of diffraction pattern 24 onto the second substrate. Embossed, metallized products may be repeatedly produced by this process, and transfer film 12 may be repeatedly used to form a plurality of such products having diffraction images without repeated emboss coating and release coating of the transfer film.

Thus, the present invention overcomes the problems of the prior art in that a durable, relatively hard transfer film containing a surface relief diffraction pattern may be easily manufactured which can withstand repeated uses in applications such as high volume, mass production of metallized embossed diffraction patterns on a variety of wide and narrow web products.

Having described the various embodiments of the present invention with reference to the accompanying figures, it will be appreciated that various changes and modifications can be made without departing from the scope or spirit of the invention.

I claim:
1. A process for impressing a diffraction image on a polymeric film comprising the steps of:
   providing a body of polymeric film;
   orienting the film by applying tension thereto along at least one axis;
   maintaining the film at a desired annealing temperature which is above room temperature while maintaining tension in the film;
   continuing to maintain the temperature of the film above room temperature while embossing a diffraction pattern into a surface of the film, the film being continuously maintained above room temperature, and under tension, from the time the film temperature is at the desired annealing temperature until the time the diffraction pattern is embossed into the film;
   cooling the film to a temperature below the annealing temperature after the film has been embossed; and
   releasing the tension in the film.

2. The process of claim 1 wherein the step of orienting the film includes the step of orienting the film along a first and second axis, the second axis extending normally to the first axis.

3. The process of claim 1 wherein the step of providing a body of polymeric film includes the step of providing a body of coextruded polymeric film.

4. The process of claim 1 further including the step of depositing a metallic layer over the diffraction pattern embossed into the surface of the film to create a metallic embossed surface.

5. The process of claim 4 further including the step of demetallizing selected areas of the metallic layer.

6. The process of claim 4 further including the steps of applying a second substrate to the metallic layer and separating the film from the second substrate and metallic layer.

7. A process for impressing a diffraction image on a polymeric film comprising the steps of:
   providing a body of polymeric film;
   orienting the film along a first axis by applying tension thereto along said first axis;
   orienting the film along a second axis, by applying tension thereto along the second axis which is normal to the first axis;
   maintaining the film at a desired annealing temperature above room temperature;
   continuing to maintain the film at a temperature above room temperature and under tension while embossing a diffraction pattern into a surface of the film, the film being continuously maintained at a temperature above room temperature and under tension from the time the film temperature is at the desired annealing temperature until the time the diffraction pattern is embossed into the film; and
   cooling the film to room temperature after it has been embossed.

8. The process of claim 7 wherein the step of providing a body of polymeric film includes the step of providing a body of coextruded polymeric film.

9. The process of claim 7 wherein the step of orienting the film along the first axis includes the step of passing the film through a series of powered calender rollers.

10. The process of claim 7 wherein the step of orienting the film along the second axis includes the step of clamping the edges of the film in a tenter frame.

11. A process for impressing a diffraction image into a polymeric film comprising the steps of:

providing a body of thermoplastic film;

orienting the film along a first axis by passing the film through a series of powered calender rollers which tension the film in the longitudinal direction;

orienting the film along a second axis, normal to the first axis, by clamping the edges of the film in a tenter frame which tensions the film in the transverse direction;

raising the temperature of the film to a desired annealing temperature above room temperature;

continuing to maintain the film at a temperature above room temperature while embossing a diffraction pattern into a surface of the film, the film being continuously maintained at a temperature above room temperature and under tension along at least one of said first and second axes from the time the film temperature is raised to the desired annealing temperature until the diffraction pattern is embossed into the film;

cooling the film to room temperature; and depositing a metallic layer over the diffraction pattern embossed into the surface of the film.

12. The process of claim 11, further including the steps of applying a second substrate to the metallic layer, and separating the film from the metallic layer and second substrate.

13. The method of claim 12 wherein the step of applying a second substrate to the metallic layer includes the steps of applying an adhesive to the metallic layer and applying a second substrate to the adhesive.

14. In a process for impressing a diffraction image into a polymeric film comprising the steps of: (1) providing a body of polymeric film; (2) orienting the film by applying tension thereto and annealing the film at a temperature above room temperature; and (3) embossing a diffraction pattern into the surface of the film, the improvement comprising:

maintaining the film at a temperature above room temperature and under tension from the time the film is annealed until the time the diffraction pattern is embossed into the film.

15. An apparatus for impressing a diffraction image into a body of polymeric film extending along a first and second axis, the second axis normal to the first axis, comprising:

means for orienting the film by applying tension thereto along at least one of the first and second axes;

means for annealing the film at a temperature above room temperature;

means for embossing a diffraction pattern into a surface of the film;

means for continuously maintaining the film at a temperature above room temperature and under tension along said at least one first and second axes from the time the film is annealed until after the film is embossed; and means for cooling the film to below room temperature.

16. The apparatus of claim 15 wherein the means for orienting the film along the first and second axes includes a plurality of calender rollers.

17. The apparatus of claim 15 wherein the means for orienting the film along the first and second axes includes a tenter frame having a plurality of grippers configured to grip the edges of the film.

18. The apparatus of claim 15 wherein the means for annealing the film includes an annealing oven.

* * * * *